United States Patent [19]

Schulz et al.

[11] Patent Number: 4,663,408

[45] Date of Patent: May 5, 1987

[54] TETRAPOLYMERS OF N-VINYL PYRROLIDONE/ACRYLAMIDE/SALT OF ACRYLIC ACID/N-ALKYL ACRYLAMIDE

[75] Inventors: Donald N. Schulz, Annandale; Enock Berluche, Phillipsburg; John J. Maurer, New Providence; Jan Bock, Bridgewater, all of N.J.

[73] Assignee: Exxon Research and Engineering Company, Florham Park, N.J.

[21] Appl. No.: 814,362

[22] Filed: Dec. 30, 1985

[51] Int. Cl.[4] .............................................. C08F 20/06

[52] U.S. Cl. ..................................... 526/240; 526/264

[58] Field of Search ....................... 526/240, 264, 307.2

[56] References Cited

U.S. PATENT DOCUMENTS 4,395,524 7/1983 Emmons ............................ 526/264

4,521,580 6/1985 Turner ............................ 526/307.2

*Primary Examiner*—Paul R. Michl

*Attorney, Agent, or Firm*—Richard E. Nanfeldt

[57] ABSTRACT

The present invention relates to improved viscosification agents for an aqueous or brine solutions. Typically, the viscosification agents are tetrapolymers of N-vinyl pyrrolidone/acrylamide/salt of acrylic acid/N-alkyl acrylamide wherein said tetrapolymers have the formula:

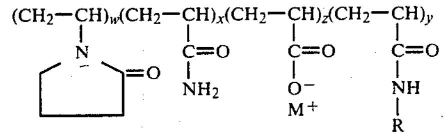

wherein w is about 1 to about 80 mole percent, more preferably about 5 to about 75 mole percent, and most preferably about 10 to about 70 mole percent; x is about 10 to about 90 mole percent, more preferably about 20 to about 80 mole percent, and most preferably about 30 to about 70 mole percent; and y is about 0.1 to about 10.0 mole percent, more preferably about 0.15 to about 5.0 mole percent; and most preferably about 0.2 to about 3.0 mole percent; z is about 1.0 to about 30.0 mole percent, more preferably about 2.0 to about 25.0 mole percent, and most preferably about 5.0 to about 20.0 mole percent; R is an alkyl group having about 6 to about 30 carbon atoms, more preferably about 7 to about 20, and most preferably about 8 to about 18; and M is a cation selected from the group consisting of monovalent cations, preferably $Na^+$, $K^+$ or $R_4N^+$.

1 Claim, 1 Drawing Figure

TETRAPOLYMERS OF N-VINYL PYRROLIDONE/ACRYLAMIDE/SALT OF ACRYLIC ACID/N-ALKYL ACRYLAMIDE

FIELD OF THE INVENTION

The present invention relates to improved viscosification agents for a variety of aqueous solutions, wherein the viscosification agents are tetrapolymers of N-vinyl pyrrolidone/acrylamide/salt of acrylic acid/N-alkyl acrylamide. The present invention also relates to processes for preparing said tetrapolymers.

BACKGROUND OF THE INVENTION

Polymeric materials are generally considered useful as viscosification agents when dissolved in an appropriate solvent system. The major reason for this viscosity enhancement is due to the very large dimensions of the individual polymer chain as compared to the dimension of the single solvent molecules. Any increase in size of the polymer chain will produce a corresponding enhancement in the viscosity of the solution. This effect is maximized when the polymer is dissolved in a "good" solvent. Therefore, in general, a hydrocarbon soluble polymer is useful for thickening hydrocarbon solvents, while a water soluble polymer is appropriate for increasing the viscosity of aqueous systems. With regard to aqueous systems, polyelectrolytes (e.g., hydrolyzed polyacrylamide) are very useful and commonly used materials; however, the solution properties of these materials begin to deteriorate as ionizable additives (i.e., acids, bases or salts) are dissolved in the solution. These additives screen the charges that are fixed along the polymer backbone which results in a decrease in the dimensions of the polymer molecule. The viscosity diminishes as long as the chain continues to shrink. Additionally, polyacrylamide-type polymers suffer from poor hydrolytic or thermal hydrolytic stability. This hydrolytic instability becomes especially undesirable in the presence of divalent cations because polymer precipitation occurs. Moreover, polyacrylamide polymers build viscosity by increasing polymer molecular weight. Increasing molecular weight leads to increasing mechanical shear instability.

N-vinyl pyrrolidone (NVP) homopolymers are well known and reviewed by Davidson and Sittig in *Water-Soluble Resins.* Such homopolymers are characterized by good hydrolytic stability, even in the presence of electrolytes, but poor viscosification efficiency (viscosity per unit concentration) and undesirable adsorption on rock. (H. P. Frank, *J. Polymer Sci.,* 12, 5;65 (1954); A. Conix, *J. Polymer Sci.,* 15, 221 (1955); G. A. Stahl, European Patent Application No. 84100918.6 (Jan. 30, 1984).

Copolymers of NVP with acrylamide (AM) have also been disclosed. (A. M. Chatterjee and C. M. Burns, *Canadian Journal of Chem.,* 49, 3249 (1971); G. A. Stahl, European Patent Application No. 84100918.6 (Jan. 30, 1984). Such materials have improved hydrolytic stabilities. However, the viscosification efficiency of such materials is still low.

Acrylamide copolymers containing small amounts of long chain $C_6$–$C_{20}$ N-alkylacrylamide show enhanced viscosification efficiency, while suffering the debit of relatively poor hydrolytic stability (e.g., Bock, et al., U.S. Pat. No. 4,520,182). Bock further noted that special microemulsion or micellar polymerization techniques were required to produce soluble copolymers of acrylamide and long chain N-alkylacrylamide (e.g., n-octylacrylamide) for use as efficient viscosifiers. (See also U.S. Pat. No. 4,528,348 and U.S. Pat. No. 4,521,580, both filed on Aug. 29, 1983).

G. A. Stahl (European Patent Application No. 84100918.6, Jan. 30, 1984) broadly teaches terpolymers of NVP, AM and minor amounts of a third monomer selected from the group of hydrophobic compounds as vinyl pyridines, hydroxylated esters of ethylenically-unsaturated carboxylic acids and N- and N,N-alkylacrylamide, where the alkyl group contains more than 2 carbon atoms. (Stahl, page 23, line 15 to page 24, line 25). While these monomers are hydrophobic, some are water dispersible or even water soluble (e.g., isopropyl acrylamide) and some are water insoluble (e.g., n-octylacrylamide). Thus, the critical distinction between water soluble (dispersible) hydrophobic monomers and water insoluble hydrophobic monomers was not made. Moreover, no terpolymers containing the highly hydrophobic (insoluble) long chain N-alkylacrylamide were exemplified, possibly because of the difficulty in incorporating such monomers into homogeneous water soluble terpolymers.

For example, Bock in U.S. Pat. No. 4,520,182 notes that the:

> synthesis of copolymers composed of water soluble and water insoluble monomers [e.g., long chain N-alkyl acrylamides] presents difficulties.

In order for polymerization to be effected, the monomers must obviously come into close proximity to one another . . . .

For example, simply dispersing the water insoluble monomer as fine particles in the aqueous medium while dissolving the water soluble monomer in water would result in poor incorporation of the water insoluble monomer and would lead to a heterogeneous product polymer (Bock, U.S. Pat. No. 4,520,182, column 1, lines 40–57).

The instant tetrapolymers show enhanced viscosification, hydrolytic stability and/or mechanical stability compared with other typical polymers of the art.

SUMMARY OF THE INVENTION

The present invention relates to improved viscosification agents for an aqueous solution which can contain high concentrations of salts. Typically, the viscosification agents are tetrapolymers of N-vinyl pyrrolidone/acrylamide/salt of acrylic acid/N-alkyl acrylamide wherein said tetrapolymers have the formula:

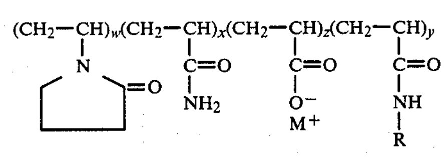

wherein w is about 1 to about 80 mole percent, more preferably about 5 to about 75 mole percent, and most preferably about 10 to about 70 mole percent; x is about 10 to about 90 mole percent, more preferably about 20 to about 80 mole percent, and most preferably about 30 to about 70 mole percent; and y is about 0.1 to about 10.0 mole percent, more preferably about 0.15 to about 5.0 mole percent; and most peferably about 0.2 to about 3.0 mole percent; z is about 1.0 to about 30.0 mole percent, more preferably about 2.0 to about 25.0 mole percent, and most preferably about 5.0 to about 20.0 mole percent; R is an alkyl group having about 6 to about 30 carbon atoms, more preferably about 7 to about 20, and most preferably about 8 to about 18; and M is a cation selected from the group consisting of monovalent cations, preferably $Na^+$, $K^+$ or $R_4N^+$.

GENERAL DESCRIPTION OF THE INVENTION

The present invention relates to improved viscosification agents for an aqueous solution which can contain high concentrations of acids, bases or salts. Typically, the viscosification agents are tetrapolymers of N-vinyl pyrrolidone/acrylamide/salt of acrylic acid/N-alkylacrylamide wherein said tetrapolymers have the formula:

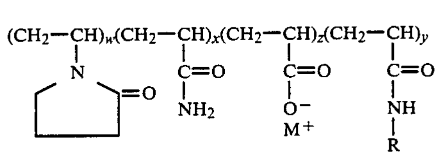

wherein w is about 1 to about 80 mole percent, more preferably about 5 to about 75 mole percent, and most preferably about 10 to about 70 mole percent; x is about 10 to about 90 mole percent, more preferably about 20 to about 80 mole percent, and most preferably about 30 to about 70 mole percent; and y is about 0.1 to about 10.0 mole percent, more preferably about 0.15 to about 5.0 mole percent; and most preferably about 0.2 to about 3.0 mole percent; z is about 1.0 to about 30.0 mole percent, more preferably about 2.0 to about 25.0 mole percent, and most preferably about 5.0 to about 20.0 mole percent; R is an alkyl group having about 6 to about 30 carbon atoms, more preferably about 7 to about 20, and most preferably about 8 to about 18; and M is a cation selected from the group consisting of monovalent cations, preferably $Na^+$, $K^+$ or $R_4N^+$.

The polymer molecular weights, as indicated by intrinsic viscosities and confirmed by sedimentation/light scattering, for tetrapolymers of N-vinyl pyrrolidone/acrylamide/metallic salt of acrylic acid/N-alkyl acrylamide is is about $10^3$ to about $20\times10^6$, more preferably about $10^4$ to about $15\times10^6$, and most preferably about $10^5$ to about $5\times10^6$. The molecular weights of the tetrapolymers are determined from solution viscosity measurements via standard methods and confirmed by sedimentation/light scattering. Specifically, following the initial isolation of the water soluble terpolymers and tetrapolymers, they are redissolved in salt water (e.g., 2% NaCl or 3% NaCl+0.3% $CaCl_2$) to give solutions with known concentrations. The low shear viscosities of the solutions and the pure solvent were measured in a standard Contraves viscometer. Subsequently, the reduced viscosity is calculated through standard methods utilizing these values. Extrapolation to zero polymer concentration leads to the intrinsic viscosity of the polymer solution. The intrinsic viscosity is directly related to the molecular weight through the well-known Mark-Houwink relationship.

$[\eta]=KM^{\alpha}$, where $[\eta]$ is the intrinsic viscosity, M=molecular weight, K and $\alpha$ are a function of polymer structure.

The water soluble terpolymers of acrylamide/N-vinylpyrrolidone/N-alkylacrylamide, which are the precursors to the instant tetrapolymers of N-vinylpyrrolidone/acrylamide are formed by a free radical terpolymerization in an aqueous medium which comprises the steps of forming a homogeneous mixture of acrylamide monomer, N-vinyl pyrrolidone monomer and N-alkylacrylamide monomer in the presence of an alkyl or alkylarene sulfate or sulfonate, such as sodium lauryl sulfate (SDS), to help solubilize the N-alkylacrylamide in distilled water, wherein the total monomer concentration is about 1 to about 40 grams of total monomer per 100 grams of water, more preferably about 2 to about 30 and most preferably about 5 to about 20; SDS concentration is about 0.1–15 grams per 100 grams of water, more preferably from 0.2–10 grams per 100 grams of water, and most preferably 0.8–7 grams per 100 grams of water; purging the reaction solution with nitrogen; heating the reaction solution to at least 10° C. while maintaining the nitrogen purge; adding sufficient free radical initiator of the proper decomposition temperature to initiate terpolymerization of the acrylamide monomer, the N-vinyl pyrrolidone monomer, and the N-alkyl acrylamide monomer; terpolymerizing said monomers of acrylamide, N-vinyl pyrrolidone and N-alkyl acrylamide monomer at a sufficient temperature and for a sufficient period of time to form said water soluble terpolymer; and recovering said water soluble terpolymer from said reaction solution.

The total concentration of monomers in the water is about 1 to about 40 grams of total monomer per 100 grams of water, more preferably about 2 to about 30, and most preferably about 5 to about 20. Terpolymerization of the acrylamide monomer, N-vinyl pyrrolidone monomer, and N-alkyl acrylamide monomer is effected at a temperature of about 10° C. to about 90° C., more preferably at about 10° C. to about 70° C., and most preferably about 20° C. to about 60° C. for a period of time of about 1 to about 24 hours, more preferably about 2 to about 10 hours, and most preferably about 3 to about 8 hours.

Although NVP monomer will dissolve substantial quantities of long chain N-alkylacrylamide monomers (e.g., n-octylacrylamide), the addition of water and AM monomer often leads to a cloudy, nonhomogeneous reaction mixture. Addition of SDS clarifies the solution and solubilizes the hydrophobic monomer in the aqueous phase, thereby improving the process. Also, the use of SDS leads to a more gel-free product by visual inspection.

A suitable method of recovery of the formed water soluble terpolymer from the aqueous reaction solution comprises precipitation in acetone, methanol, ethanol and the like.

Suitable water or oil soluble free radical initiators for the free radical terpolymerization of the acrylamide monomers, the N-vinyl pyrrolidone, and the N-alkyl acrylamide monomer are selected from the group consisting of azo compounds, peroxides and persulfates. However, the preferred initiators are azo compounds, such as 2,2'-azobisisobutyronitrile (AIBN) (e.g., DuPont's Vazo-64®), 2,2'azobis(2-amidopropane)hydrochloride (Wako's V-50®), 2-t-butylazo-2-cyanopropane. Most preferred initiators are low temperature azo initiators, such as 2,2'azobis(2,4-dimethyl-4-methoxyvaleronitrile) (Dupont's Vazo-33®). The use of low temperature initiation and polymerization leads to higher polymer molecular weights. The concentration of the free radical initiator is about 0.001 to about 2.0 grams of free radical initiator per 100 grams of total monomer, more preferably about 0.01 to about 1.0, and most preferably about 0.05 to about 0.1.

DESCRIPTION OF THE PREFERRED EMBODIMENTS

Figure 1:
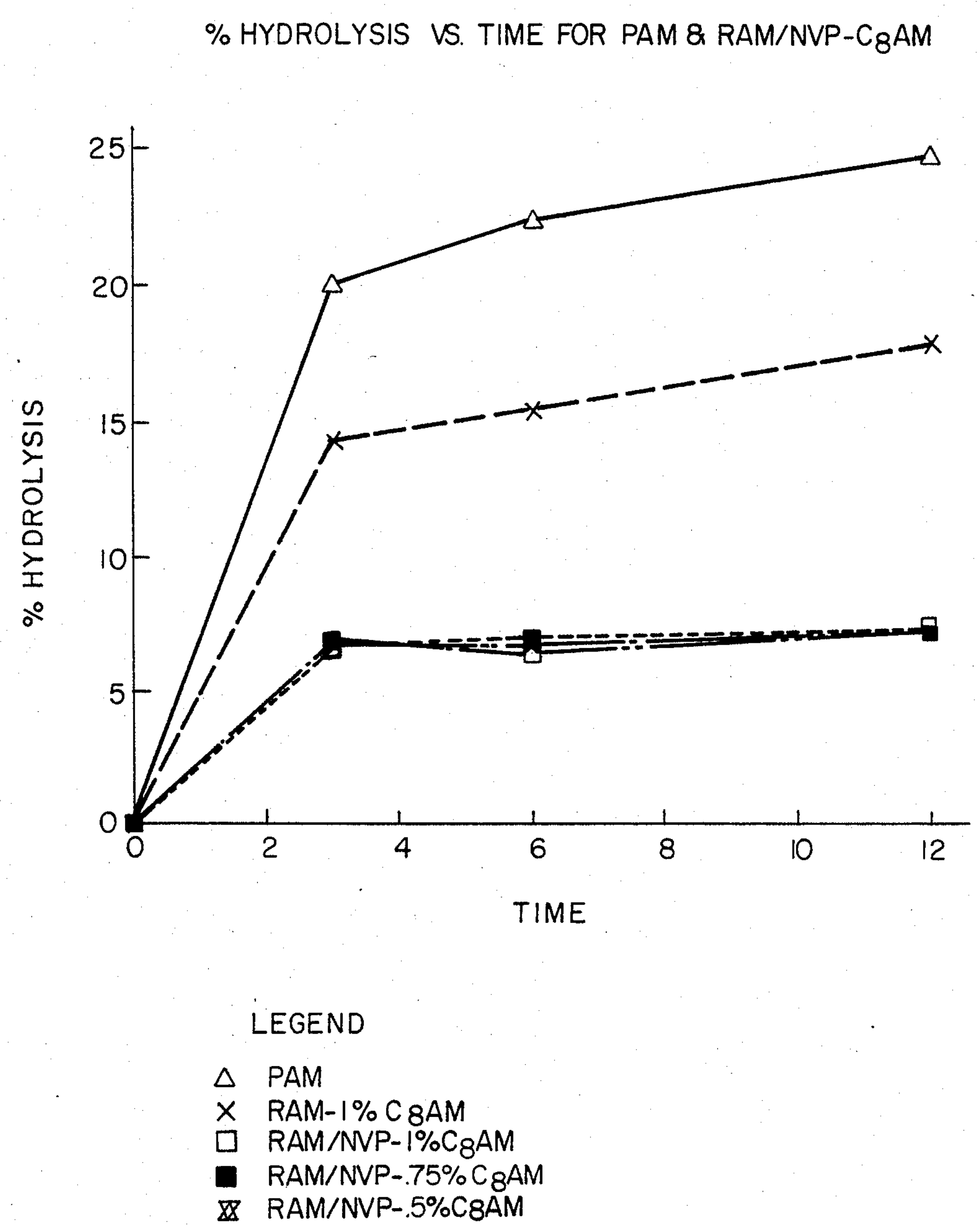

The following Examples illustrate the present invention, without, however, limiting the same hereto. The following nomenclature will be used in the Examples: NVP-RAM=NVP/long chain N-alkylacrylamide/acrylamide terpolymer; NVP-HRAM=NVP/acrylamide/long chain N-alkylacrylamide/salt of acrylic acid terpolymer; NVP-AM=NVP/acrylamide copolymer; NVP-HPAM=NVP/acrylamide/salt of acrylic acid terpolymer; and PAM=polyacrylamide.

EXAMPLE 1

Preparation of NVP-RAM Terpolymers (11044-63)

A 1,000 ml resin flask was fitted with a condenser, thermometer, stirrer (electric), and nitrogen inlet and outlet. N-octylacrylamide (0.65 g), NVP (11.88 g) and acrylamide (17.47 g) in 470 g $H_2O$ were polymerized with 0.123 g AIBN in the presence of 1.7 g sodium dodecyl sulfate (SDS) at 45° C. for 18 hours. This corresponds to a $[M]/[I]^{\frac{1}{2}}=60$ (monomer to initiator ratio) and total solids content of 6% in $H_2O$. Although NVP helps solubilize octylacrylamides, the SDS further homogenizes and clarifies the reaction mixture. The resulting polymer solution was a soluble gel. It was passed through a meat grinder and diluted further with water to 1% concentration. The polymer solution was precipitated in 6 liters of acetone. Copolymers with various ratios of $C_8$ hydrophobe were prepared and their viscometrics are compared in Table I. The viscosification efficiency of the instant copolymers compared with the composition containing no hydrophobe (NVP/AM/$C_8$AM=30/70/0) is clearly evident.

EXAMPLE 2

Preparation of NVP-HRAM Tetrapolymers

Five gm quantities of the solid polymers prepared in Example 1 were dissolved in 500 ml of $H_2O$ and heated to 60° C. to facilitate dissolution. They were then cooled to 40° C. and mixed with a solution of NaOH (0.55 g NaOH/300 g $H_2O$) for 18 hours. The batches were heated to 40° C. for 3 hours. Tetrapolymers with about 7% hydrolysis and various ratios of $C_8$ hydrophobe were prepared and their viscometrics are compared in Table II. It is obvious that the NVP-HRAM tetrapolymers are superior viscosifiers compared with a NVP/HPAM containing no $C_8$ hydrophobe and to NVP/RAM polymers containing no salt of acrylic acid (cf. Example 1 and Table I).

EXAMPLE 3

Low temperature azo initiators like Vazo $33^R$ at 20°-30° C. polymerization temperatures were also used to prepare NVP-RAM and NVP-HRAM polymers. These materials were shown to be efficient brine viscosifiers with even better solution quality/clarity than the polymers prepared in Examples 1 and 2. These polymers also exhibited modest amounts of shear thickening rheology (Table III).

EXAMPLE 4

The rate of base ($OH^-$) catalyzed hydrolysis of NVP-RAM terpolymers compared to NVP/AM copolymers and PAM (polyacrylamide homopolymer) at 40° C. is shown in Table IV. Surprisingly, the NVP-RAM polymers with varying amounts of $C_8$ (0.5-1% $C_8$) show less hydrolysis than both RAM and PAM polymers known in the art (Table IV). Base catalyzed hydrolysis is both a means of converting terpolymers to tetrapolymers and a measure of the hydrolytic stability of instant materials.

TABLE I

N—VINYL-PYRROLIDONE-ACRYLAMIDE-N—OCTYLACRYLAMIDE TERPOLYMERS

| Polymer Type NVP/AM/$C_8$AM[a] | .15% Polymer, 3.0% NaCl, 0.3% $CaCl_2$ Brine Solution, CPS |
|---|---|
| 30/70/0 | 3.1[b] |
| 30/69.5/0.5 | 5.3 |
| 30/69.25/0.75 | 6.8 |
| 30/69.0/1.0 | 17.5 |

[a] $[M]/[I]^{\frac{1}{2}} = 60$
[b] $[\eta]$ = 7.02 dl/g in 2% NaCl

TABLE II

N—VINYL PYRROLIDONE-ACRYLAMIDE-METAL SALT OF ACRYLIC ACID-N—ALKYLACRYLAMIDE (NVP-HRAM) TETRAPOLYMERS

| Base Polymer Type NVP/AM/$C_8$AM[a] | % Hydrolysis (Na Carboxylate) | Viscosity .15 polymer 3.0% NaCl, 0.3% $CaCl_2$ Brine Solution, CPS |
|---|---|---|
| 30/70/0 | 7.0 | 3.5 |
| 30/69.5/0.5 | 6.5 | 6.7 |
| 30/69.25/0.75 | 6.7 | 11.2 |
| 30/69.0/1.0 | 6.9 | 600-1267 |

[a] Polymers of Example 1, before hydrolysis

TABLE III

NVP-HRAMS PREPARED WITH VAZO-33 (LOW TEMPERATURE)

| Polymer Type NVP/Am/$C_8$AM | $[M]/[I]^{\frac{1}{2}}$ | % SDS | Temp. | % Hyd. | Viscosity (.15% in 3.3 Na/Ca Brine CPS, at $13s^{-1}$) | Viscosity (.15% in 3.3% Na/Ca Brine CPS, at $1.3s^{-1}$) |
|---|---|---|---|---|---|---|
| 30/69.25/.75 | 60 | 1.0 | 30 | — | 9.5 | 10.8 |
| " | 60 | 1.0 | 24 | 7.7 | 20.0 | 44.0 |
| " | 60 | 1.0 | 20 | 8.5 | 16.7 | 33.0 |
| " | 75 | 1.0 | 24 | 5.6 | 10.7 | 13.8 |
| " | 60 | 1.0 | 20 | 9.6 | 16.75 | 29. |
| 30/69.1/.9 | 60 | 1.0 | 24 | 17.0 | 17.1 | 75.5 |
| " | 60 | 1.0 | 24 | 3.7 | 26.0 | 35.2 |
| " | 60 | 1.5 | 20 | 7.1 | 14.6 | 18.2 |
| " | 75 | 1.5 | 24 | 7.5 | 14.10 | 19.0 |
| " | 60 | 1.5 | 20 | 11.4 | 15.0 | 19.0 |

*Clear solutions - little or no haze or particles

TABLE IV

% HYDROLYSIS VERSUS TIME FOR TERPOLYMERS

| Polymer Type | Hydrolysis Time, Hours[a] | % Hydrolysis |
|---|---|---|
| PAM | 3 | 22.0 |
| | 6 | 22.5 |
| | 12 | 24.0 |
| RAM (1% $C_8$ AM) | 3 | 14.0 |
| | 6 | 15.5 |
| | 12 | 17.0 |
| RAM-NVP (1% $C_8$ AM) | 3 | 6.9 |
| | 6 | 6.4 |
| | 12 | 7.4 |

[a] 40° C., ratio of moles of NaOH/moles polymer = ⅓.

What is claimed is:

1. A tetrapolymer having the formula consisting essentially of:

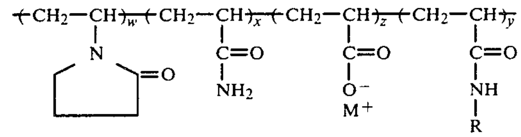

wherein w is about 1 to about 80 mole percent; x is about 10 to about 90 mole percent; y is about 0.2 to about 3.0 mole percent; z is about 5.0 to about 20.0 mole percent; R is an alkyl group having about 6 to about 30 carbon atoms; and M is a cation selected from the group consisting of monovalent cations, preferably $Na^+$, $K^+$ or $R_4N^+$, wherein said tetrapolymer is formed by a base hydrolysis of a terpolymer having the formula:

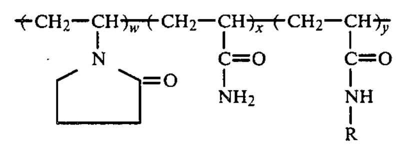

wherein w is about 1 to about 80 mole percent; x is about 10 to about 90 mole percent; and R is an alkyl group having about 6 to about 30 carbon atoms.

* * * * *